(12) United States Patent
Wang et al.

(10) Patent No.: US 10,054,069 B2
(45) Date of Patent: Aug. 21, 2018

(54) METHOD AND APPARATUS FOR MODEL BASED CONTROL OF ELECTRICAL BOOSTING SYSTEM

(71) Applicant: GM GLOBAL TECHNOLOGY OPERATIONS LLC, Detroit, MI (US)

(72) Inventors: Yue-Yun Wang, Troy, MI (US); Lei Hao, Troy, MI (US); Gianmarco Brunetti, Leamington Spa (GB)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/243,869

(22) Filed: Aug. 22, 2016

(65) Prior Publication Data

US 2018/0051638 A1 Feb. 22, 2018

(51) Int. Cl.
*F02D 41/00* (2006.01)
*F02B 37/04* (2006.01)
*F02B 37/10* (2006.01)
*F02B 37/24* (2006.01)
*F02D 41/14* (2006.01)
*F02D 41/28* (2006.01)

(52) U.S. Cl.
CPC .......... *F02D 41/0007* (2013.01); *F02B 37/04* (2013.01); *F02B 37/24* (2013.01); *F02D 41/1401* (2013.01); *F02D 41/28* (2013.01); *F02D 2041/1409* (2013.01)

(58) Field of Classification Search
CPC .. F02D 41/0007; F02D 41/1401; F02D 41/28; F02D 2041/1409; F02B 37/04; F02B 37/24

USPC .......................................................... 701/103
See application file for complete search history.

(56) References Cited

U.S. PATENT DOCUMENTS

| 8,209,979 | B2 | 7/2012 | Wang | |
|---|---|---|---|---|
| 2006/0207252 | A1* | 9/2006 | Isobe | F02D 23/02 60/601 |
| 2007/0033938 | A1* | 2/2007 | Ueno | F02B 37/004 60/612 |
| 2016/0348578 | A1* | 12/2016 | Oyagi | F02B 39/16 |
| 2017/0138278 | A1* | 5/2017 | Xiao | F02D 41/005 |

OTHER PUBLICATIONS

U.S. Appl. No. 14/550,673, Ibrahim Haskara.

* cited by examiner

*Primary Examiner* — Mahmoud Gimie

(57) ABSTRACT

A two-stage air boosting system for an internal combustion engine has a first air boosting system which is one of an electrical air boosting system or a turbocharger air boosting system. The two-stage air boosting system also includes a second air boosting system which is the other one of the electrical air boosting system or the turbocharger air boosting system and is positioned intermediate the first air boosting system and an air intake manifold of the internal combustion engine. A plurality of sensors provides information relating to operation of the two-stage air boosting system including inlet conditions of a compressor of the second air boosting system. A control module is configured to receive a plurality of inputs including the information relating to operation of the two-stage air boosting system, and is further configured to provide a system control command for the two-stage air boosting system responsive to the inputs.

19 Claims, 6 Drawing Sheets

METHOD AND APPARATUS FOR MODEL BASED CONTROL OF ELECTRICAL BOOSTING SYSTEM

TECHNICAL FIELD

This disclosure is related to control of internal combustion engines.

BACKGROUND

The statements in this section merely provide background information related to the present disclosure. Accordingly, such statements are not intended to constitute an admission of prior art.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. A turbocharger utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example as provided by an accessory belt, to drive a compressor providing boost air to the engine. Engine control methods control boost air in order to control the resulting combustion within the engine and the resulting output of the engine.

Exemplary engines may utilize two-stage boosting wherein a secondary turbocharger is utilized to increase air flow to the engine. The secondary turbocharger may be an electrical turbocharger. Methods of controlling an engine having two-stage boosting varies from the control methods of a single-stage boosted engine. The control may be achieved using unique model based control of the electrical boosting system using at least one of power split control models and power balance control models.

SUMMARY

A two-stage air boosting system for an internal combustion engine has a first air boosting system which is one of an electrical air boosting system or a turbocharger air boosting system. The two-stage air boosting system also includes a second air boosting system which is the other one of the electrical air boosting system or the turbocharger air boosting system and is positioned intermediate the first air boosting system and an air intake manifold of the internal combustion engine. A plurality of sensors provides information relating to operation of the two-stage air boosting system including inlet conditions of a compressor of the second air boosting system. A control module is configured to receive a plurality of inputs including the information relating to operation of the two-stage air boosting system, and is further configured to provide a system control command for the two-stage air boosting system responsive to the inputs.

BRIEF DESCRIPTION OF THE DRAWINGS

One or more embodiments will now be described, by way of example, with reference to the accompanying drawings, in which.

DETAILED DESCRIPTION

Figure 1:
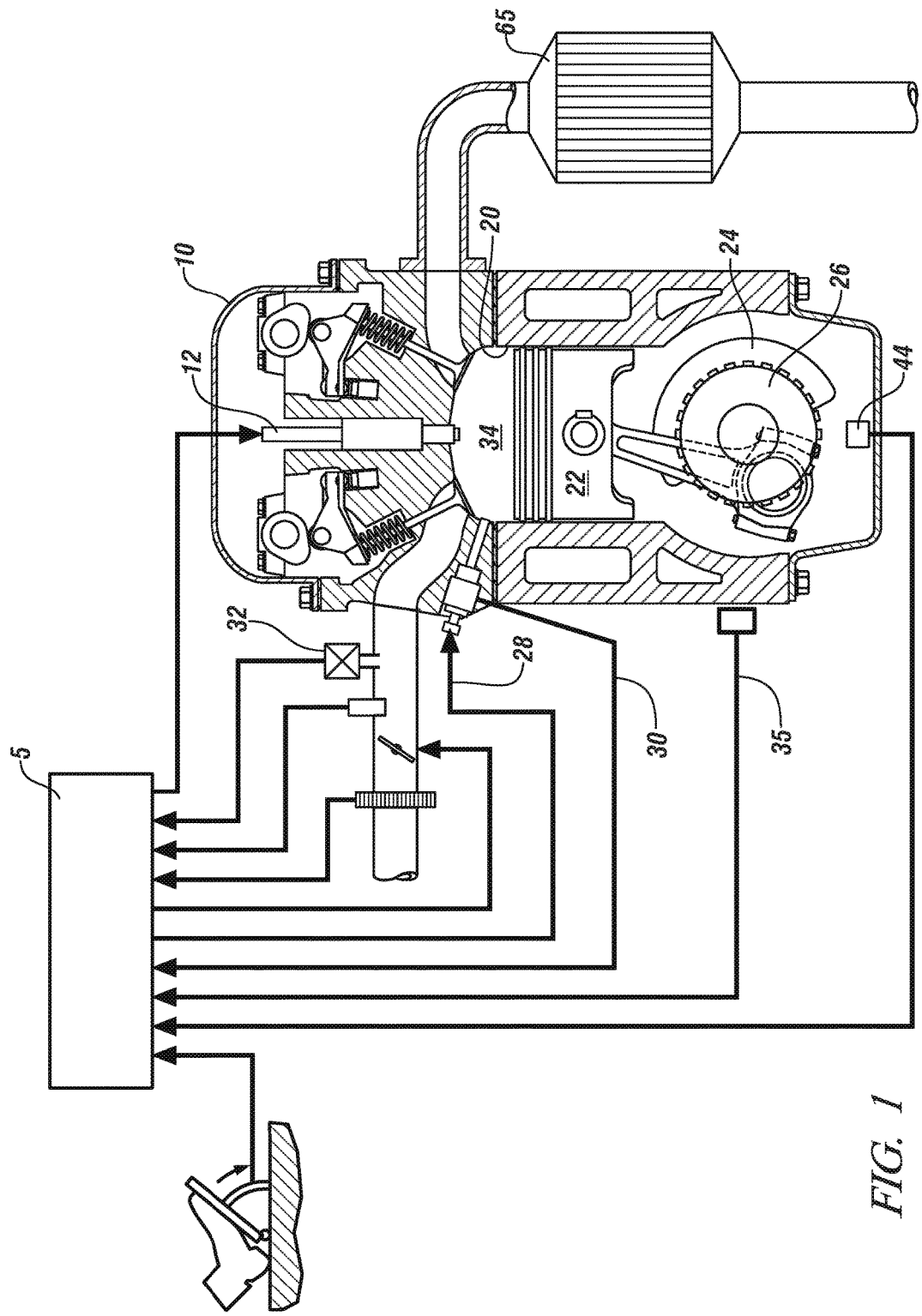
FIG. 1 schematically depicts an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, in accordance with the present disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate either at stoichiometry or primarily lean of stoichiometry, e.g., lean-burn spark-ignition engines or the conventional gasoline engines. During normal operation of the compression-ignition engine, a combustion event occurs during each engine cycle when a fuel charge is injected into the combustion chamber to form, with the intake air and recirculated exhaust gas, the cylinder charge. The charge is subsequently combusted by action of compression thereof during the compression stroke.

The engine is adapted to operate over a broad range of temperatures, cylinder charge (air, fuel, and EGR) and injection events. The methods disclosed herein are particularly suited to operation with direct-injection compression-ignition engines operating lean of stoichiometry to determine parameters which correlate to heat release in each of the combustion chambers during ongoing operation. The methods are further applicable to other engine configurations and their subsystems, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 monitoring engine coolant temperature (COOLANT). The system may include an exhaust gas sensor for monitoring states of one or more exhaust gas parameters, e.g., temperature, air/fuel ratio, and constituents. One having ordinary skill in the art understands that there may be other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and routines.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glow-plug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and has operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, exhaust gas recirculation (EGR) valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit (s), input/output circuit(s) and devices, appropriate signal conditioning and buffer circuitry, and other suitable components to provide the desired functionality. The control module has a set of control routines, including resident software program instructions and calibrations stored in memory and executed to provide the desired functions. The routines are preferably executed during preset loop cycles. Routines are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 depicts an exemplary diesel engine, however, the present disclosure can be utilized on other engine configurations, for example, including gasoline-fueled engines, ethanol or E85 fueled engines, or other similar known designs. The disclosure is not intended to be limited to the particular exemplary embodiments disclosed herein.

Figure 2:
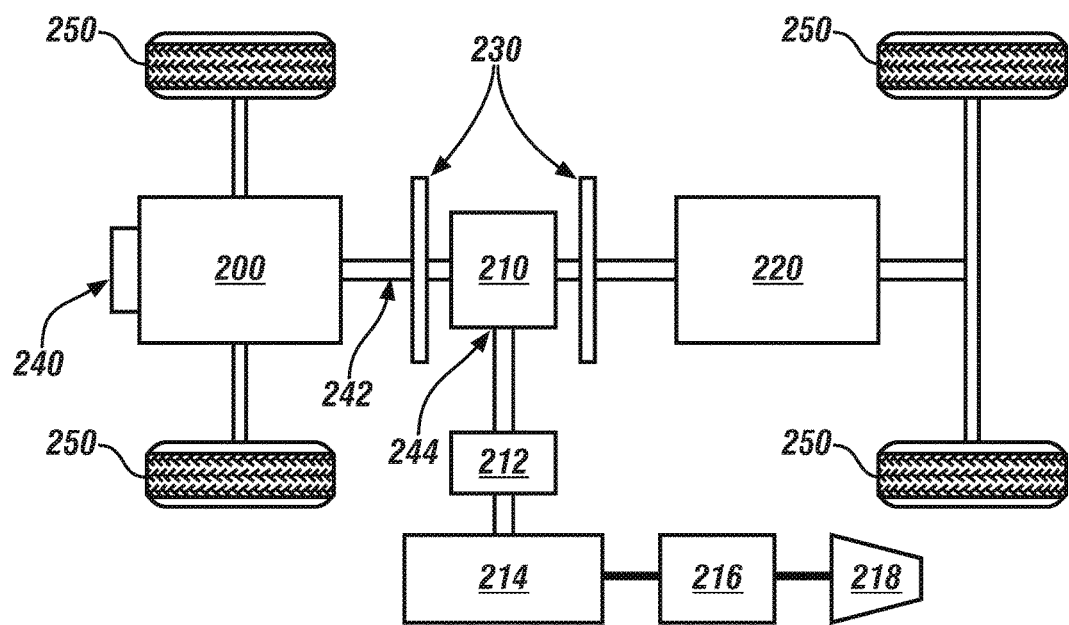
FIG. 2 schematically depicts an exemplary hybrid vehicle configuration including an engine, an electric torque machine and a compressor, in accordance with the present disclosure.

FIG. 2 schematically depicts an exemplary hybrid vehicle configuration for a vehicle having electrical charging or boost. The exemplary hybrid vehicle configuration includes an engine 200 and an electric torque machine 210. The electric torque machine may be a motor generator unit (MGU). The MGU may operate as a motor to assist in accelerating the vehicle. The MGU may also operate as a generator. When operating as a generator the MGU may recuperate energy during braking. Clutches 230 may detach the engine 200 from the transmission 220 allowing vehicle cruising without firing the engine to achieve fuel saving. The MGU is connected to an inverter 212 which is connected to battery 214. In an exemplary embodiment the battery 214 may be a 48-volt battery. The MGU may draw electrical power from battery 214 through inverter 212 when operating as a motor or may alternatively provide power to battery 214 through inverter 212 when operating as a generator. In the exemplary embodiment the MGU is located in position 244 between clutches 230. The MGU may be alternatively be located in position 240 as a belt alternator starter or in position 242 between an engine flywheel and the transmission 220. The hybrid vehicle configuration further includes a second motor 216 which draws electrical power from battery 214. Alternatively, the second motor 216 may draw electrical power from a source not configured to power the MGU and having any voltage. The electrical charging is generated by electrical compressor 218 which is driven by the second motor 216.

Figure 3A:
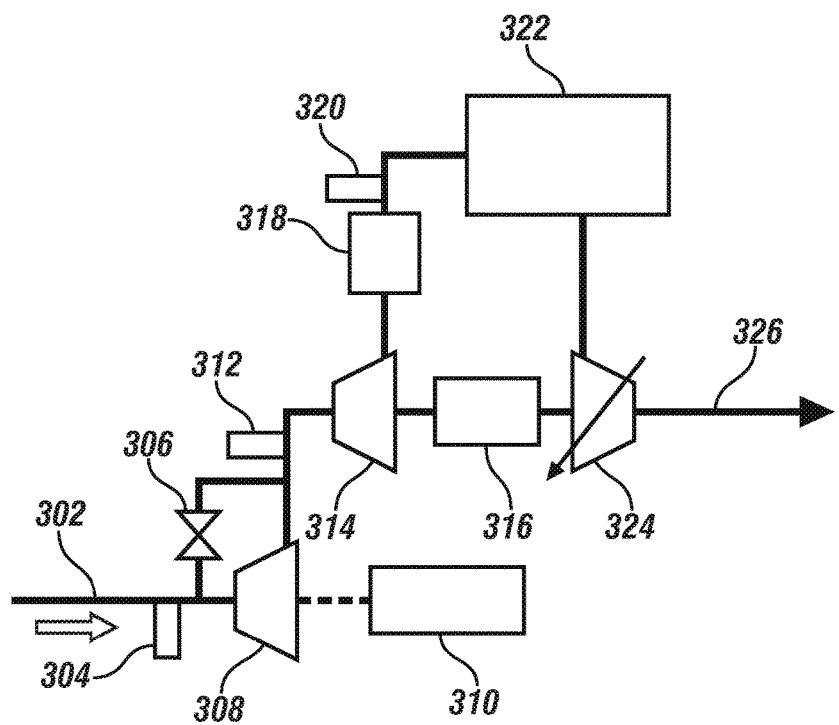
FIG. 3A schematically depicts an exemplary architecture for a diesel engine having a two-stage charging system with turbo and electrical charging, in accordance with the present disclosure.

FIG. 3A schematically depicts an exemplary architecture for a diesel engine having a two-stage charging system with conventional and electrical charging. In this FIG. 3A there is shown an air inlet conduit 302 through which ambient air passes on its way to one or more engine cylinders. There is also an exhaust gas conduit 326 through which exhaust gases from the combustion engine 322 are expelled during its normal operation. In this embodiment, a first compressor 308 is provided to compress the inlet air to increase its density to provide a higher concentration of oxygen in the air feed to the engine. The first compressor is depicted as being an electrical charging compressor which draws power from battery 310.

A second compressor 314 is provided downstream of the first compressor 308, to further compress the inlet air to increase its density to provide a higher concentration of oxygen in the air fed to the engine. The second compressor 314 is depicted as being part of a conventional charging system 316 and may be shaft-driven by a first turbine 324, which may be a variable-geometry turbine (VGT) that is disposed in the exhaust gas conduit, as is known in the art of turbo charging. There may be a VGT geometry sensor in effective sensing contact with first turbine 324 when same is a variable-geometry turbine, for providing real-time information concerning the geometry of the VGT. An intercooler 318 may be included downstream of the second compressor 314 of the conventional charging system 316 to cool the compressed air prior entering an engine air intake. The intercooler 318 is preferably provided on the high-pressure side of second compressor 314, when present, to dissipate some of the heat resulting from compression of the inlet air. There is also a by-pass valve 306 positioned to allow intake air to bypass the first compressor 308 and having a position sensor disposed in effective proximity to sense the position of the by-pass valve 306. In one exemplary embodiment, recirculation of exhaust gases (EGR) may be effected by means of a selectively-actuable valve disposed in a conduit provided between the air inlet conduit 302 and the exhaust gas conduit 326. Such embodiments may include a cooler to reduce the temperature of the re-circulated exhaust gases prior to mixing with air being admitted through the air inlet conduit 302, and an EGR valve position sensor. In preferred embodiments an aftertreatment system is disposed between an exhaust manifold of the engine and the point on the exhaust gas conduit 326 at which exhaust gases are released to the atmosphere. In some embodiments, a $\Delta p$ sensor is present for providing the difference in pressure of the exhaust gases before and after the aftertreatment system. In one embodiment, the aftertreatment system includes oxidation and reduction catalysts and a particulate filter.

Operation of the engine 322, positioned between the second compressor 314 and the turbine 324, may be beneficially controlled by providing sensors 304, 312 and 320 at the depicted general locations along the air inlet conduit 302 shown in FIG. 3A. Suitable as sensors 312 and 320 include without limitation such sensors as air inlet pressure and temperature sensors, which are useful to measure intake manifold temperature and pressure at the inlet to the second compressor 314 and downstream of the second compressor 314 prior to entering an engine air intake manifold. Suitable as sensors 304 include without limitation such sensors as mass airflow rate sensors, ambient air temperature sensors, and ambient air pressure sensors. Sensors 304 may additionally include motor speed sensors for determining the speed of the first compressor 308. In preferred embodiments, the various sensors provide inputs to at least one control module operatively connected to various devices useful for controlling combustion and engine operation, including without limitation compressor boost pressure, exhaust gas recirculation, exhaust gas pressure, the aspect ratio of a turbo charger when present, and in some cases, valve timing.

During one mode of operation of a combustion engine the various sensors 304, 312 and 320 have outputs which are provided as inputs to at least one control module. This enables control of the operation and position of by-pass valve 306 and the effective aspect ratio of turbine 324. According to one embodiment of this disclosure, a model-based approach is used to effectively control boost pressure of the first compressor 308 and the second compressor 314 by modulating the position of the by-pass valve 306 and the geometry of the variable-geometry turbine 324 as well as controlling the motor driving the electrically driven first compressor 308. This model-based control for a two-stage boosting architecture including conventional and electrical boosting, such as the architecture shown in FIG. 3A, allows significant engine downsizing for engines having two, three or four cylinders. The model-based control further provides for fast torque acceleration without turbo lag and may provide some $CO_2$ benefits. Model-based control of the electrical charger, including the first compressor 308, reduces the need for vehicle calibrations.

Figure 3B:
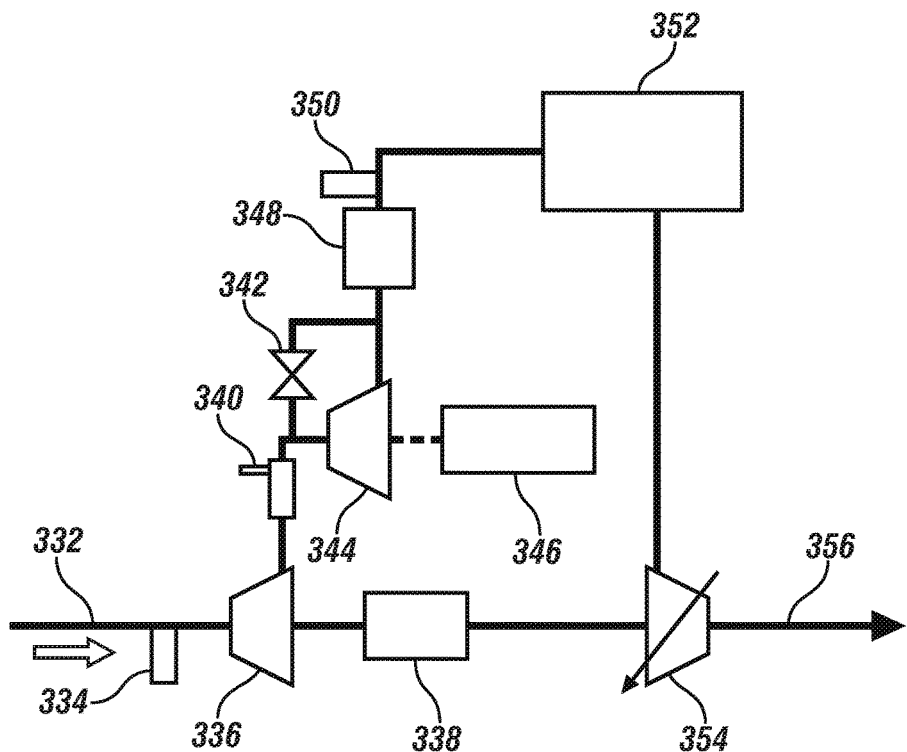
FIG. 3B schematically depicts an exemplary architecture for a diesel engine having a two-stage charging system with conventional and electrical charging, in accordance with the present disclosure.

FIG. 3B schematically depicts an exemplary architecture for a diesel engine having a two-stage charging system with conventional and electrical charging. In this FIG. 3B there is shown an air inlet conduit 332 through which ambient air passes on its way to one or more engine cylinders of combustion engine 352. There is also an exhaust gas conduit 356 through which exhaust gases from the combustion engine 352 are expelled during its normal operation.

In this embodiment, a first compressor 336 is provided to compress the inlet air to increase its density to provide a higher concentration of oxygen in the air feed to the engine. The first compressor 336 is depicted as being part of a conventional charging system 338 and may be shaft-driven by a first turbine 354, which may be a variable-geometry turbine (VGT) that is disposed in the exhaust gas conduit, as is known in the art of turbo charging. There may be a VGT geometry sensor in effective sensing contact with first turbine 354 when same is a variable-geometry turbine, for providing real-time information concerning the geometry of the VGT. A second compressor 344 is provided downstream of the first compressor 336, to further compress the inlet air to increase its density to provide a higher concentration of oxygen in the air fed to the engine. The second compressor 344 is depicted as being an electrical charging compressor which draws power from battery 346.

An intercooler 348 may be included downstream of the electrical charging system including second compressor 344 to cool the compressed air prior entering an engine air intake. The intercooler 348 is preferably provided on the high-pressure side of second compressor 344, when present, to dissipate some of the heat resulting from compression of the inlet air. There is also a by-pass valve 342 to permit intake air to bypass the second compressor 344 and having a position sensor disposed in effective proximity to sense the position of the by-pass valve 342. In one exemplary embodiment, recirculation of exhaust gases (EGR) may effected by means of a selectively-actuable valve disposed in a conduit provided between the air inlet conduit 332 and the exhaust gas conduit 356. Such embodiments may include a cooler to reduce the temperature of the re-circulated exhaust gases prior to mixing with air being admitted through the air inlet conduit 332, and an EGR valve position sensor. In preferred embodiments, there is additionally provided an aftertreatment system, disposed between an exhaust manifold of the engine and the point on the exhaust gas conduit 356 at which exhaust gases are released to the atmosphere. In some embodiments, a $\Delta p$ sensor is present for providing the difference in pressure of the exhaust gases before and after the aftertreatment system. In one embodiment, the aftertreatment system includes oxidation and reduction catalysts and a particulate filter.

Operation of an engine, positioned between the second compressor 344 and the turbine 354, may be beneficially controlled by providing sensors 334, 340 and 350 at the depicted general locations along the air inlet conduit 332. Suitable as sensors 340 and 350 include without limitation such sensors as air inlet pressure and temperature sensors, which are useful to measure intake manifold temperature and pressure at the inlet to the second compressor 344 and at the inlet to an air intake manifold of the engine downstream of second compressor 344. Sensors 340 may additionally include motor speed sensors for determining the speed of the motor driving the electrically driven second compressor 344. Suitable as sensors 334 include without limitation such sensors as mass airflow rate sensors, ambient air temperature sensors, and ambient air pressure sensors. In preferred embodiments, the various sensors present provide inputs to at least one control module operatively connected to various devices useful for controlling combustion and engine operation, including without limitation compressor boost pressure, exhaust gas recirculation, exhaust gas pressure, the aspect ratio of a turbo charger when present, and in some cases, valve timing.

During one mode of operation of the combustion engine, the various sensors 334, 340 and 350 have outputs which are provided as inputs to at least one control module. This enables control of the operation and position of by-pass valve 342 and the effective aspect ratio of turbine 354. According to one embodiment of this disclosure, a model-based approach is used to effectively control boost pressure of the first compressor 336 and the second compressor 344 by modulating the position of the by-pass valve 342 and the geometry of the variable-geometry turbine 354 as well as controlling the motor driving the electrically driven second compressor 344. This model-based control for a two-stage boosting architecture including conventional and electrical boosting, such as the architecture shown in FIG. 3B, allows significant engine downsizing for engines having two, three or four cylinders. The model-based control further provides for fast torque acceleration without turbo lag and may provide some $CO_2$ benefits. Model-based control of the electrical charger, including the second compressor 344, reduces the need for vehicle calibrations.

Figure 4A:
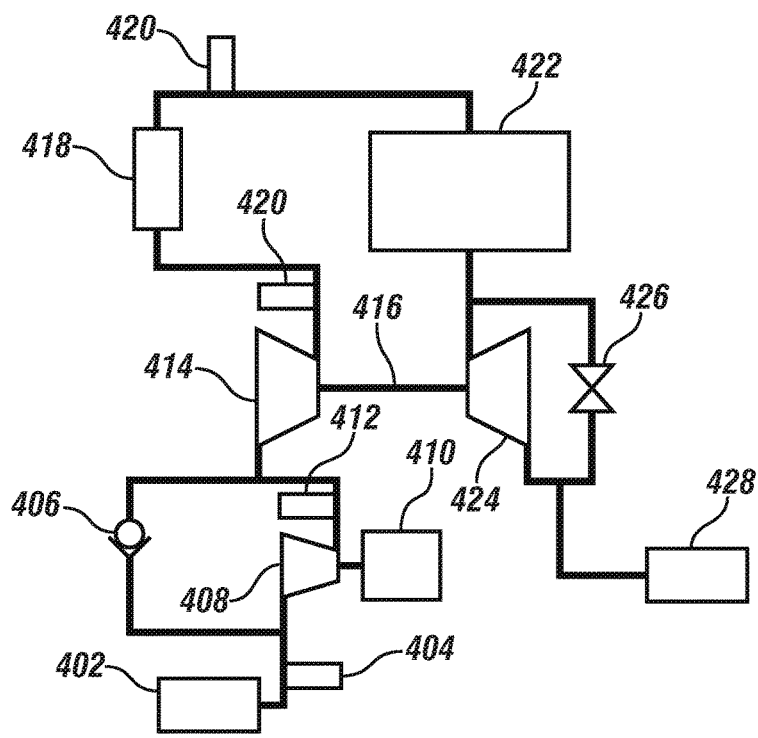
FIG. 4A schematically depicts an exemplary architecture for a gasoline engine having a two-stage charging system with conventional and electrical charging, in accordance with the present disclosure.

FIG. 4A schematically depicts an exemplary architecture for a gasoline engine having a two-stage charging system with conventional and electrical charging. In this FIG. 4A there is shown an intake system including air inlet conduit 402 through which ambient air passes on its way to one or more engine cylinders of combustion engine 422. There is also an exhaust system including exhaust gas conduit 428 through which exhaust gases from the combustion engine 422 are expelled during its normal operation. In this embodiment, a first compressor 408 is provided to compress the inlet air to increase its density to provide a higher concentration of oxygen in the air feed to the engine. The first compressor is depicted as being an electrical charging compressor which draws power from electrical drive system 410 which includes an electrical system which may include a battery or other known sources of electrical power.

A second compressor 414 is provided downstream of the first compressor 408, to further compress the inlet air to increase its density to provide a higher concentration of oxygen in the air fed to the engine. The second compressor 414 is depicted as being part of a conventional charging system 416 and may be shaft-driven by a first turbine 424, which may be a variable-geometry turbine (VGT) that is disposed in the exhaust gas conduit, as is known in the art of turbo charging. There may be a VGT geometry sensor in effective sensing contact with first turbine 424 when same is a variable-geometry turbine, for providing real-time information concerning the geometry of the VGT. An intercooler 418 may be included downstream of the second compressor 414 of conventional charging system 416 to cool the compressed air prior entering an engine air intake. The intercooler 418 is preferably provided on the high-pressure side of second compressor 414, when present, to dissipate some of the heat resulting from compression of the inlet air. There is a by-pass valve 406 positioned such that intake air may bypass the electrically powered first compressor 408 and having a position sensor disposed in effective proximity to sense the position of the by-pass valve 406. Wastegate valve 426 is configured to divert exhaust gas away from turbine 424. In one exemplary embodiment, recirculation of exhaust gases (EGR) may effected by means of a selectively-actuable valve disposed in a conduit provided between the air inlet conduit 402 and the exhaust gas conduit 428. Such embodiments may include a cooler to reduce the temperature of the re-circulated exhaust gases prior to mixing with air being admitted through the air inlet conduit 402, and an EGR valve position sensor. In preferred embodiments, there is additionally provided an aftertreatment system, disposed between an exhaust manifold of the engine 422 and the point on the exhaust gas conduit 428 at which exhaust gases are released to the atmosphere. In some embodiments, a Δp sensor is present for providing the difference in pressure of the exhaust gases before and after the aftertreatment system. In one embodiment, the aftertreatment system includes oxidation and reduction catalysts and a particulate filter.

Operation of engine 422 may be beneficially controlled by providing sensors 404, 412 and 420 at the depicted general locations along the air inlet conduit 402. Suitable as sensors 412 and 420 include without limitation such sensors as air inlet pressure and temperature sensors, which are useful to measure intake manifold temperature and pressure at the inlet to the second compressor 414 as well as at the air intake manifold of engine 422. Suitable as sensors 404 include without limitation such sensors as mass airflow rate sensors, ambient air temperature sensors, and ambient air pressure sensors. Sensors 404 may additionally include motor speed sensors for determining the speed of the first compressor 408. In preferred embodiments, the various sensors present provide inputs to at least one control module operatively connected to various devices useful for controlling combustion and engine operation, including without limitation compressor boost pressure, exhaust gas recirculation, exhaust gas pressure, the aspect ratio of a turbo charger when present, and in some cases, valve timing.

During one mode of operation of combustion engine 422 the various sensors 404, 412 and 420 have outputs which are provided as inputs to at least one control module. This enables control of the operation and position of by-pass valve 406 and the effective aspect ratio of turbine 424. According to one embodiment of this disclosure, a model-based approach is used to effectively control boost pressure of the first compressor 408 and the second compressor 414 by modulating the position of the by-pass valve 406 and the geometry of the variable-geometry turbine 424 as well as controlling the motor driving the electrically driven first compressor 408. This model-based control for a two-stage boosting architecture including conventional and electrical boosting allows significant engine downsizing for engines having two, three or four cylinders. The model-based control further provides for fast torque acceleration without turbo lag and may provide some $CO_2$ benefits. Model-based control of the electrical charger, including the first compressor 408, reduces the need for vehicle calibrations.

Figure 4B:
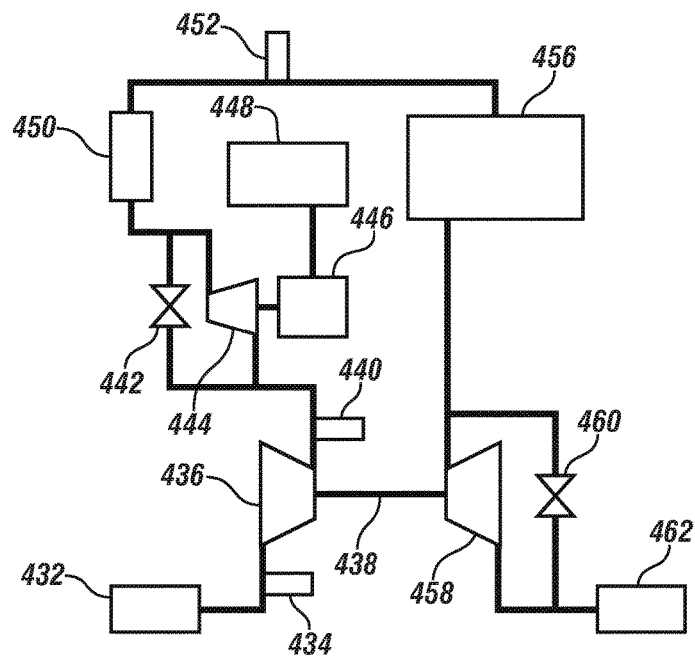
FIG. 4B schematically depicts an exemplary architecture for a gasoline engine having a two-stage charging system with conventional and electrical charging, in accordance with the present disclosure.

FIG. 4B schematically depicts an exemplary architecture for a gasoline engine having a two-stage charging system with conventional and electrical charging. In this FIG. 4B there is shown an air inlet conduit 432 through which ambient air passes on its way to one or more engine cylinders of combustion engine 456. There is also an exhaust gas conduit 462 through which exhaust gases from the combustion engine 456 are expelled during its normal operation.

In this embodiment, a first compressor 436 is provided to compress the inlet air to increase its density to provide a higher concentration of oxygen in the air feed to the engine. The first compressor 436 is depicted as being part of a conventional charging system 438 and may be shaft-driven by a first turbine 458, which may be a variable-geometry turbine (VGT) that is disposed in the exhaust gas conduit, as is known in the art of turbo charging. There may be a VGT geometry sensor in effective sensing contact with first turbine 458 when same is a variable-geometry turbine, for providing real-time information concerning the geometry of the VGT. A second compressor 444 is provided downstream of the first compressor 436, to further compress the inlet air to increase its density to provide a higher concentration of oxygen in the air fed to the engine. The second compressor 444 is depicted as being an electrical charging compressor which draws power from electrical drive 446 and electrical system 448, which may include a battery or other known sources of electrical power.

An intercooler 450 may be included downstream of the electrical charging system including second compressor 444 to cool the compressed air prior entering an engine air intake. The intercooler 450 is preferably provided on the high-pressure side of second compressor 444, when present, to dissipate some of the heat resulting from compression of the inlet air. There is also a by-pass valve 442 to permit intake air to bypass the second compressor 444 and having a position sensor disposed in effective proximity to sense the position of the by-pass valve 442. Wastegate valve 460 is configured to divert exhaust gas away from turbine 458 of the conventional charging system 438. In one exemplary embodiment, recirculation of exhaust gases (EGR) may effected by means of a selectively-actuable valve disposed in a conduit provided between the air inlet conduit 432 and the exhaust gas conduit 462. Such embodiments may include a cooler to reduce the temperature of the re-circulated exhaust gases prior to mixing with air being admitted through the air inlet conduit 432, and an EGR valve position sensor. In preferred embodiments, there is additionally provided an aftertreatment system, disposed between an exhaust manifold of the engine and the point on the exhaust gas conduit 462 at which exhaust gases are released to the atmosphere. In some embodiments, a Δp sensor is present for providing the difference in pressure of the exhaust gases before and after the aftertreatment system. In one embodiment, the aftertreatment system includes oxidation and reduction catalysts and a particulate filter.

Operation of engine 456 may be beneficially controlled by providing sensors 434, 440, and 452 at the depicted general locations along the air inlet conduit 432. Suitable as sensors 440 and 452 include without limitation such sensors as air inlet pressure and temperature sensors, which are useful to measure intake manifold temperature and pressure at the inlet to the second compressor 444 as well as at the air intake manifold of engine 456. Sensors 440 may additionally include motor speed sensors for determining the speed of the electrical drive 446 driving the electrically driven second compressor 444. Suitable as sensors 434 include without limitation such sensors as mass airflow rate sensors, ambient air temperature sensors, and ambient air pressure sensors. In preferred embodiments, the various sensors present provide inputs to at least one control module operatively connected to various devices useful for controlling combustion and engine operation, including without limitation compressor boost pressure, exhaust gas recirculation, exhaust gas pressure, the aspect ratio of a turbo charger when present, and in some cases, valve timing.

During one mode of operation of combustion engine 456, the various sensors 434, 440 and 452 have outputs which are provided as inputs to at least one control module. This enables control of the operation and position of by-pass valve 442 and the effective aspect ratio of turbine 458. According to one embodiment of this disclosure, a model-based approach is used to effectively control boost pressure of the first compressor 436 and the second compressor 444 by modulating the position of the by-pass valve 442 and the geometry of the variable-geometry turbine 458 as well as controlling the motor driving the electrically driven second compressor 444. This model-based control for a two-stage boosting architecture including conventional and electrical boosting allows significant engine downsizing for engines having two, three or four cylinders. The model-based control further provides for fast torque acceleration without turbo lag and may provide some $CO_2$ benefits. Model-based control of the electrical charger, including the second compressor 436, reduces the need for vehicle calibrations.

It is appreciated by one having ordinary skill in the art that while the various components described above with reference to FIGS. 3A, 3B, 4A and 4B are depicted in schematic view, many of the elements described, including the air inlet conduit and exhaust gas conduit, may be provided by integral castings, such as intake and exhaust manifolds which comprise one or more of such components, to the extent that such configurations are generally known in the art. In one embodiment, the engine is a compression-ignition engine, operating using diesel fractions, oils, or esters such as "biodiesel" as fuel. In another embodiment, the engine is a spark-ignition engine, operated using gasoline, ethanol, mixtures thereof, or other normally-liquid hydrocarbons and oxygenates as fuel.

Figure 5A:
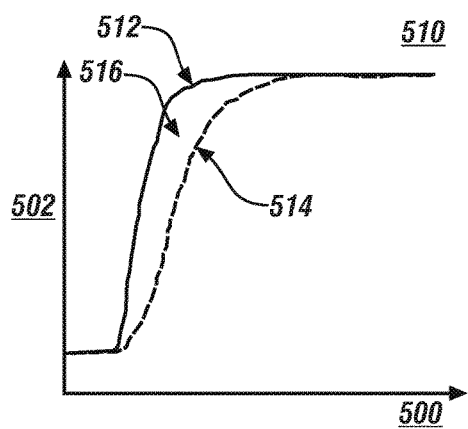
FIG. 5A graphically depicts an exemplary power split of a two-stage boosted system having conventional and electrical charging, in accordance with the present disclosure.

FIG. 5A graphically depicts an exemplary power split of a two-stage boosted system having conventional and electrical charging. The figure graphically represents a model based power split method to control a two-stage boosting system including conventional and electrical charging systems. In an exemplary architecture having an electrically powered compressor as well as a conventional charging system including a second compressor a pressure ratio across the electrical charging system $p_{re}$ may be determined based on sensor feedback from upstream and downstream of the compressor of the electrical charging system. A pressure ratio across the conventional charging system $p_{rc}$ may also be determined based on sensor feedback from upstream and downstream of the compressor of the conventional charging system. Plot 510 depicts pressure ratio along the vertical axis 502 over time along the horizontal axis 500. A total desired pressure ratio 512 across both the conventional and electrical charging systems $p_{r\_des}$ is depicted. 514 depicts a desired pressure ratio across the conventional charging system $p_{rc\_des}$. Accordingly, the difference 516 between the desired pressure ratio across the conventional charging system 514 and the total desired pressure ratio 512 is the desired pressure ratio 516 across the electrical charging system $p_{rc\_des}$.

The total desired pressure ratio $p_{r\_des}$ 512 may be expressed by the following relationship:

$$p_{r\_des} = \frac{p_{i\_des}}{p_a} = p_{rc\_des} \times p_{re\_des} = \frac{p_{i\_des}}{p_{c\_ds\_des}} \times \frac{p_{c\_dc\_des}}{p_a} \qquad [1]$$

wherein $p_{r_{des}}$ is a total pressure ratio across both stages of the two stage air boosting system;
$p_{i_{des}}$ is a desired intake pressure at an engine intake manifold of the internal combustion engine;
$p_a$ is an ambient pressure;
$p_{re_{des}}$ is a desired pressure ratio across the first stage of the two-stage air boosting system;
$p_{rc_{des}}$ is a desired pressure ratio across the second stage of the two-stage air boosting system; and $$p_{c_{ds_{des}}}$$

is a desired pressure downstream of the second stage of the two-stage air boosting system.

Figure 5B:
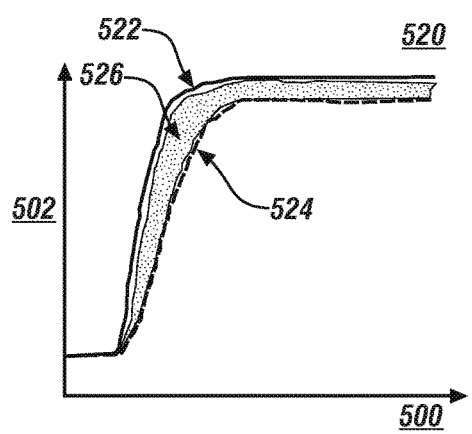
FIG. 5B graphically depicts an exemplary power split of a two-stage boosted system having conventional and electrical charging, wherein the electrical charging compensates lag in the conventional charging, in accordance with the present disclosure.

FIG. 5B graphically depicts an exemplary power split of a two-stage boosted system having conventional and electrical charging, wherein the electrical charging compensates lag in the conventional charging. The figure graphically represents an alternative model based power split method to control a two-stage boosting system including conventional and electrical charging systems. In an exemplary architecture having an electrically powered compressor as well as a conventional charging system including a second compressor a pressure ratio across the electrical charging system $p_{re}$ may be determined based on sensor feedback from upstream and downstream of the compressor of the electrical charging system. A pressure ratio across the conventional charging system $p_{rc}$ may also be determined based on sensor feedback from upstream and downstream of the compressor of the conventional charging system. Plot 520 depicts pressure ratio along the vertical axis 502 over time along the horizontal axis 500. A total desired pressure ratio 522 across both the conventional and electrical charging systems $p_{r\_des}$ is depicted. 524 depicts a monitored pressure ratio across the conventional charging system $p_{rc}$. Accordingly, the difference 526 between the monitored pressure ratio across the conventional charging system 524 and the total desired pressure ratio 522 is the desired pressure ratio 526 across the electrical charging system $p_{re\_des}$. In this exemplary control method the conventional turbo is set to achieve the total desired pressure ratio across both the electrical and conventional boost systems such that $p_{r\_des}$ is equal to $p_{rc\_des}$. The electrical charging system is controlled to compensate for turbo lag between the total desired pressure ratio 522 and the pressure ratio achieved by the conventional charger 524. The pressure ratio reference for the electrical charging system may be expressed by the following relationship:

$$p_{re} = \frac{(p_{i\_des} \div p_a)}{(p_i \div p_{c\_ds})} \qquad [2]$$

wherein $p_{i\_des}$ is the desired intake pressure at the engine intake manifold, $p_a$ is the ambient pressure, $p_i$ is the monitored air pressure at the engine intake, and $p_{c\_ds}$ is the monitored pressure downstream of the compressor of the conventional charging system.

Figure 6:
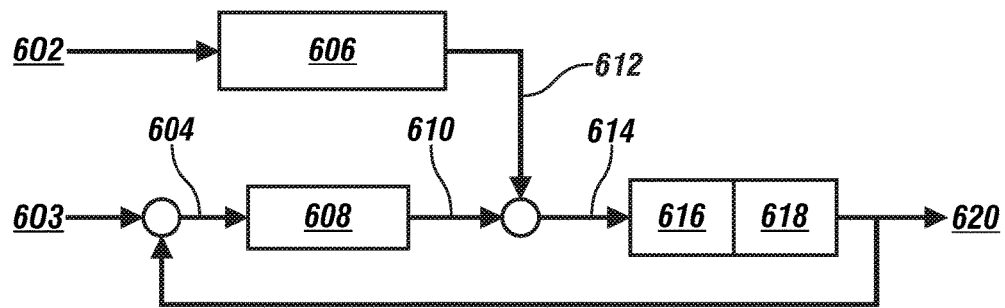
FIG. 6 schematically depicts an exemplary adaptive PID control for a model-based energy balance control in a feed forward torque control mode, in accordance with the present disclosure.

FIG. 6 schematically depicts an exemplary adaptive PID control for a model-based energy balance control in a feed forward torque control mode. Input 602 is provided to feed forward controller 606 which determines a desired motor torque $T_e$ 612 of the electrical motor for the electrical charging system in accordance with the following relationship:

$$T_e = \frac{1}{c}\left(\frac{cP_c}{\omega} - j\left(\frac{W_c\sqrt{T_a}}{p_a}\right)\right) \quad [3]$$

wherein c is calibration constant, $p_c$ is the desired power of the compressor of the electrical charging system, $\omega$ is the desired speed of the motor, j is the turboshaft inertia, Wc is the mass air flow through the electrical compressor, $T_a$ is the ambient temperature, and $p_a$ is the ambient pressure.

In the exemplary embodiment, input 602 is a desired pressure ratio across the electrical charging system $p_{re\_des}$.

Input 603 is a desired value and may be any of desired pressure ratio across the electrical charging system $p_{re\_des}$, a desired boost pressure at the intake manifold of the engine $p_{i\_des}$ and a desired engine torque $T_{rq\_des}$. The chosen desired value of input 603 is compared with output 620 which is the respective one of an actual pressure ratio across the electrical charging system $p_{re}$, an actual boost pressure at the intake manifold of the engine $p_i$ and an actual engine torque $T_{rq}$. The comparison determines the difference 604 between the desired value 603 and actual value 620 which is then input into PID controller 608. PID controller 608 determines the scheduled PID gains 610 based on the determined error 604 between the desired input value 603 and actual value 620 as a function of a desired motor speed. The feedforward motor torque value 612 is then added to the PID error value 610 which determines a desired motor torque command 614. Desired motor torque command 614 is used to control motor 616 and charger 618 to achieve the output value 620.

This feedforward torque control mode may be expressed by the following relationship:

$$\frac{dp_{re}}{dt} = cT_e - \frac{1}{\omega}cW_cc_pT_ar_e\left(p_{re}, \frac{W_c\sqrt{T_a}}{p_a}\right) + j(t) - B\omega \quad [4]$$

wherein $c_p$ is specific heat under constant pressure, $r_e$ denotes a nonlinear function of $$\left(p_{re} \text{ and } \frac{W_c\sqrt{T_a}}{p_a}\right),$$

and

B is a damping coefficient associated with the rotational system of electrical machine and mechanical load.

The feedforward motor torque control may be expressed by the following relationship:

$$T_e = \frac{1}{c}\left(\frac{cP_c}{\omega} - j + v\right) = \frac{1}{c}\left(\frac{cW_cc_pT_ar_e}{\omega} - j + v\right) \quad [5]$$

Figure 7:
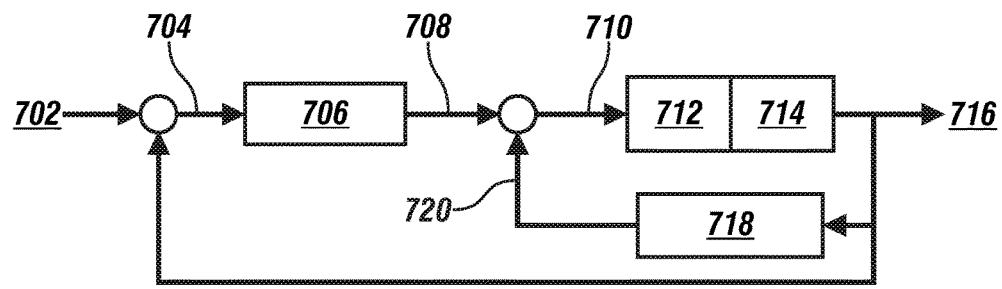
FIG. 7 schematically depicts an exemplary adaptive PID control for a model-based energy balance control in a feedback linearization torque control mode, in accordance with the present disclosure.

FIG. 7 schematically depicts an exemplary adaptive PID control for a model-based energy balance control in a feedback linearization torque control mode. Output 716 is provided to feedback linearization controller 718 which determines a motor torque $T_e$ of the electrical motor for the electrical charging system by executing equation [3]. In the exemplary embodiment, output 716 is one of an actual pressure ratio across the electrical charging system pre, an actual boost pressure at the intake manifold of the engine pi and an actual torque for the motor of the electrical charging system $T_{rq}$.

Input 702 is a desired value and may be a desired pressure ratio across the electrical charging system $p_{re\_des}$. The value of input 702 is compared with output 716 which is the actual pressure ratio across the electrical charging system $p_{re}$. The comparison determines the difference 704 between the input value 702 and actual value 716 which is then input into PID controller 706. PID controller 706 determines the error value v 708 between the desired input value 702 and actual value 716 as a function of a desired motor speed. The feedback linearization motor torque value 720 is then added to the PID control value 708 which determines a motor torque command 710. Motor torque command 710 is used to control motor 712 and charger 714 to achieve the output value 716. This feedback linearization torque control mode may be expressed by equation [4]. The feedback linearization motor torque control may be expressed by equation [5].

Figure 8:
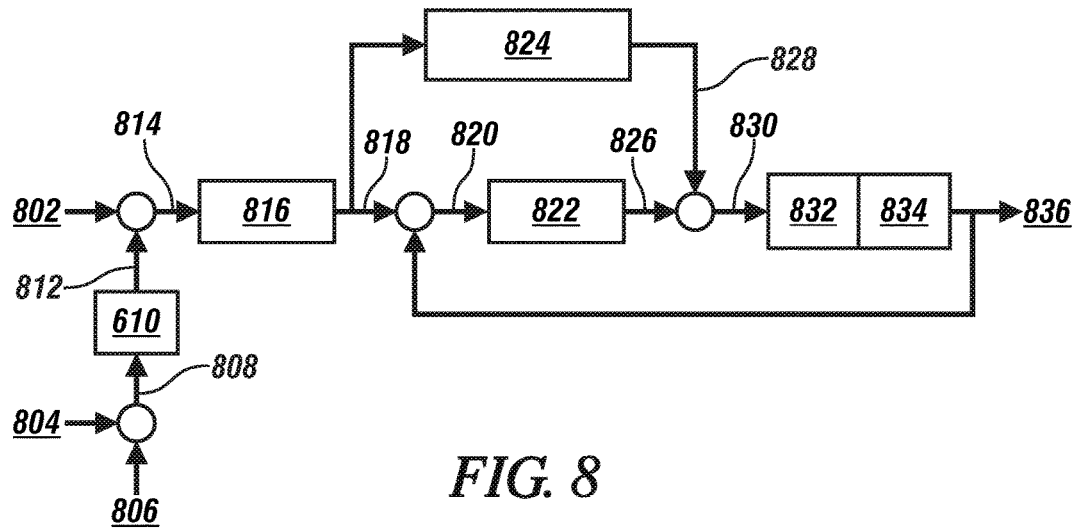
FIG. 8 schematically depicts an exemplary adaptive PID control for a model-based energy balance control in a feed forward speed control mode, in accordance with the present disclosure.

FIG. 8 schematically depicts an exemplary adaptive PID control for a model-based energy balance control in a feed forward speed control mode. A desired engine torque $T_{rq\_des}$ 804 is compared with a monitored engine torque $T_{rq\_eng}$ 806 to determine the difference 808 which is input into PID controller 810 to determine an error value 812 between the desired torque value 804 and actual engine torque value 806 as a function of a desired motor speed. In an alternative embodiment the input value 804 may be the desired pressure ratio across an electrical charging system $P_{re\_des}$. The value 812 is then added to a desired motor speed $\omega_{des}$ 802. This product 814 is input into controller 816 where a rate limit is applied to determine motor speed reference value 818. Value 818 is then compared with the actual motor speed $\omega$ 836 which is provided as feedback from the monitored motor 832. The compared value 820 is input into PID controller 822 to determine the error value v 826 between the motor reference speed value 818 and actual motor speed value 836. The motor reference speed value 818 is additionally provided to feedforward controller 824 which determines a torque value $T_e$ 828 for the electrical charger motor based on the desired motor speed value 818. The feedforward controller may determine the torque value 828 based upon the following relationship:

$$T_e = \frac{1}{\omega_{des}}P_c + B\omega_{des} \quad [6]$$

wherein $\omega_{des}$ is the desired speed of the motor, and $P_c$ is the desired power of the compressor of the electrical charger.

The error value 826 is then added to the torque value 828 to determine a motor torque command 830 which is then utilized to control the motor 832 and the charger 834. This feedforward speed control mode includes first generating a motor speed reference which may be expressed by the following relationship:

$$\omega_{des} = \sqrt{T_a} \times f\left(p_{re_{des}}, \frac{W_c\sqrt{T_a}}{p_a}\right) \quad [7]$$

The generated motor speed reference is then utilized in an energy balance equation which may be expressed as the following relationship:

$$J\frac{d\omega}{dt} = T_e - \frac{1}{\omega}W_c c_p T_a r_e\left(p_{re_{des}}, \frac{W_c\sqrt{T_a}}{p_a}\right) - B\omega \quad [8]$$

wherein $W_c$ is the air mass flow through the two-stage air charging system. The model based energy balance control in a speed control mode may therefore be expressed as the following relationship:

$$T_e = \frac{1}{\omega}P_c + B\omega + v = \frac{1}{\omega}(cW_c c_p T_a r_e) + B\omega + v \quad [9]$$

Figure 9:
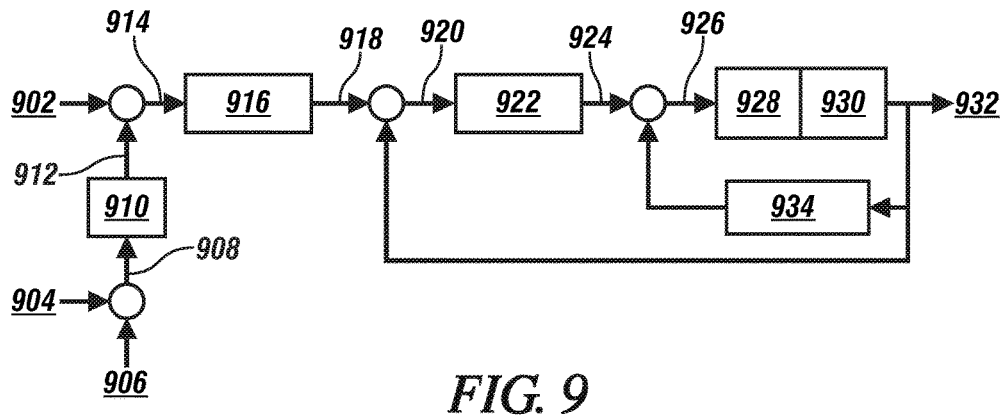
FIG. 9 schematically depicts an exemplary adaptive PID control for a model-based energy balance control in a feedback linearization speed control mode, in accordance with the present disclosure.

FIG. 9 schematically depicts an exemplary adaptive PID control for a model-based energy balance control in a feedback linearization speed control mode. A desired engine torque $T_{rq\_des}$ 904 is compared with a monitored engine torque $T_{rq\_eng}$ 906 to determine the difference 908 which is input into PID controller 910 to determine a motor speed reference correction value 912 from the desired torque value 904 and actual engine torque value 906. In an alternative embodiment the input value 904 may be the desired pressure ratio across an electrical charging system $P_{re\_des}$. The value 912 is then added to a desired motor speed $\omega_{des}$ 902. This summation 914 is input into controller 916 where a rate limit is applied to determine motor reference speed value 918. Value 918 is then compared with the actual motor speed $\omega$ 932 which is provided as feedback from the monitored motor 928. The compared value 920 is input into PID controller 922 to determine the error value v 924 between the motor reference speed value 918 and actual motor speed value 932. The actual motor speed value 932 is additionally provided to feedback linearization controller 934 which determines a torque value $T_e$ 936 for the electrical charger motor based on the actual motor speed value 932. The feedback linearization controller may determine the torque value 936 based upon the following relationship:

$$T_e = \frac{1}{\omega}P_c + B\omega \quad [10]$$

wherein $\omega$ is the actual monitored speed 932 of the motor of the electrical charger.

The error value 924 is then added to the torque value 936 to determine a motor torque command 926 which is then utilized to control the motor 928 and the charger 930. This feedback linearization model-based energy balance control, operating in a speed control mode may be expressed by equations [8] and [9], wherein the motor torque command 926 is based upon the actual motor speed value 932 provided as torque value 936 by the feedback linearization controller 934.

Figure 10:
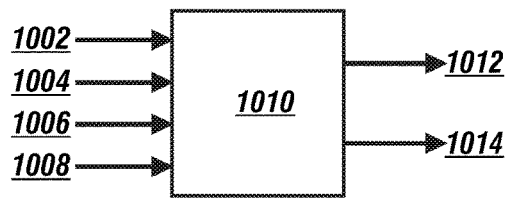
FIG. 10 schematically depicts an exemplary two-stage boost interstate virtual sensor control, in accordance with the present disclosure.

FIG. 10 schematically depicts an exemplary two-stage boost interstate virtual sensor control. In order to utilize two-stage turbocharger control, determination of the compressor inlet conditions of the compressor of the second turbocharger system is required. Inlet pressure and inlet temperature of the second turbocharger system may be estimated using virtual sensors. In an exemplary embodiment virtual sensors may be positioned as sensors 312 as depicted by FIG. 3A or the respective sensor positions depicted in the embodiments of FIG. 3B, FIG. 4A and FIG. 4B. As is depicted in FIG. 10, ambient temperature Ta 1002, ambient pressure pa 1004, intake air mass flow Wc 1006, and speed $\omega$ 1008 of the compressor of the first charging system are input into virtual sensor 1010. These values may be determined using sensors or other known methods of detecting compressor inlet conditions. Based on these input values the virtual sensor 1010 may determine the inlet pressure of the second charging system 1012 and the inlet temperature of the second charging system 1014. In an exemplary embodiment wherein the first charging system is an electrical charging system and the second charging system is a conventional charging system, the inlet pressure of the second charging system 1012 is the pressure upstream of the conventional charging system $p_{c\_up}$ and the inlet temperature of the second charging system 1014 is the pressure upstream of the conventional charging system $T_{c\_up}$. The inlet pressure of the second charging system 1012 may be determined as equating to the downstream pressure of the first charging system which may be determined by the following relationship.

$$p_{c_{ds}} = p_a \times f\left(\frac{\omega}{\sqrt{T_a}}, \frac{W_c\sqrt{T_a}}{p_a}\right) \quad [11]$$

The inlet temperature of the second charging system 1014 may be determined as equating to the downstream temperature of the first charging system which may be determined by the following relationship.

$$T_{c_{ds}} = T_a \times g\left(\frac{\omega}{\sqrt{T_a}}, \frac{W_c\sqrt{T_a}}{p_a}\right) \quad [12]$$

Figure 11:
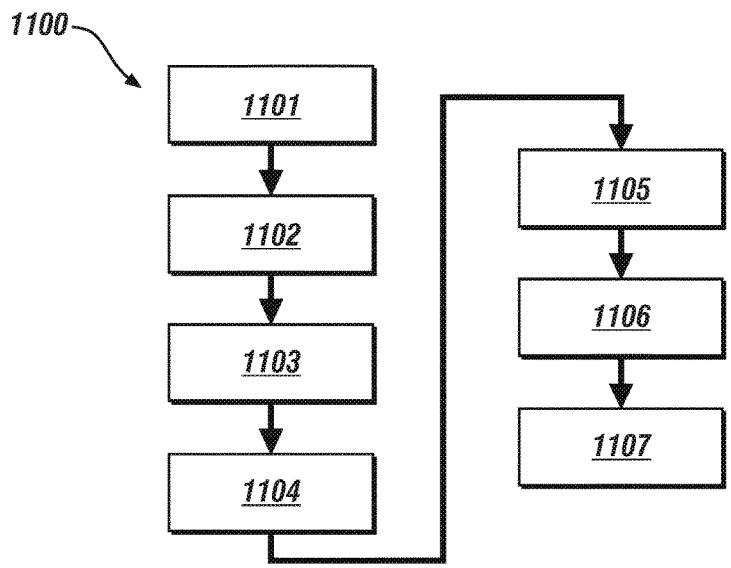
FIG. 11 schematically depicts an exemplary method to control an exemplary two-stage charging system, in accordance with the present disclosure.

FIG. 11 depicts an exemplary process of controlling a two-stage air charging or boosting system of an internal combustion engine, in accordance with the present disclosure. Table 1 is provided as a key wherein the numerically labeled blocks and the corresponding functions are set forth as follows.

TABLE 1

| BLOCK | BLOCK CONTENTS |
| --- | --- |
| 1101 | Determine at least one desired operating target command for at least one stage of the two-stage air boosting system |
| 1102 | Monitor operating parameters of the two-stage air boosting system |
| 1103 | Determine an error between the desired operating target command for the at least one stage of the two-stage air boosting system and a corresponding one of said monitored |

TABLE 1-continued

| BLOCK | BLOCK CONTENTS |
|---|---|
| | operating parameters of the two-stage air boosting system |
| 1104 | Determine scheduled PID gains based on the determined error utilizing a PID controller |
| 1105 | Determine one of a feedforward system operating parameter and a feedback linearization system operating parameter |
| 1106 | Determine a system control command for at least one stage of the two-stage air boosting system based upon the modified scheduled PID gains |
| 1107 | Control the two-stage air boosting system based upon the system control command for the air charging system. |

At step 1101 at least one desired operating target command is determined for at least one stage of the two-stage air boosting system. In an exemplary torque control mode this may include one or a combination of a desired pressure ratio across an electrical air boosting system, an actual boost pressure monitored at an intake manifold of the internal combustion engine, and a desired torque for the torque generating device of the electrical air boosting system. In an exemplary speed control mode, the at least one desired operating target command may include one or a combination of a desired speed of the torque generating device of the electrical air boosting system, a desired torque for the torque generating device of the electrical air boosting system, and a monitored torque output of the internal combustion engine. At step 1102 operating parameters of the two-stage air boosting system are monitored. This may be achieved through the use of at least one sensor. In an exemplary embodiment, the at least one sensor may include at least one sensor positioned upstream of a compressor of a first air boosting system; at least one sensor positioned downstream of the compressor of the first air boosting system and upstream of the compressor of a second air boosting system; and at least one sensor positioned downstream of the compressor of the second air boosting system and upstream of the air intake manifold of the internal combustion engine. The sensors may provide information relating to operation of the two-stage air boosting system including inlet conditions of the compressor of the second air boosting system. These sensors may be virtual sensors configured to estimate an inlet pressure and an inlet temperature of the compressor of the second air boosting system. At step 1103 an error between the desired operating target command for the at least one stage of the two-stage air boosting system and a corresponding one of said monitored operating parameters of the two-stage air boosting system is determined and scheduled PID gains are determined 1104 based on the determined error utilizing a PID controller. One of a feedforward system operating parameter and a feedback linearization system operating parameter is determined 1105, as taught with respect to the exemplary model-based energy balance control torque control mode and the exemplary model-based energy balance control speed control mode herein. At step 1106 a system control command for at least one stage of the two-stage air boosting system based upon the modified scheduled PID gains may be determined using the relationships defined herein. At step 1107 the two-stage air boosting system is controlled based upon the system control command for the air charging system.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A two-stage air boosting system for an internal combustion engine, said apparatus comprising:
a first air boosting system comprising one of an electrical air boosting system and a turbocharger air boosting system;
a second air boosting system positioned intermediate the first air boosting system and an air intake manifold of the internal combustion engine, the second air boosting system comprising the other of the electrical air boosting system and the turbocharger air boosting system;
a plurality of sensors providing information relating to operation of said two-stage air boosting system including inlet conditions of a compressor of the second air boosting system;
a control module configured to:
monitor a plurality of operating parameters of the two-stage air boosting system,
determine a desired operating target command for one of said operating parameters corresponding to one stage of the two-stage air boosting system,
determine an error between the desired operating target command and said one of said monitored operating parameters of the two-stage air boosting system,
determine scheduled PID gains based on the determined error utilizing a PID controller,
determine a system control command for the two-stage air boosting system based upon the scheduled PID gains, and
control the two-stage air boosting system based upon the system control command for the air charging system.

2. The apparatus of claim 1 wherein the plurality of sensors comprise:
at least one sensor positioned upstream of a compressor of the first air boosting system;
at least one sensor positioned downstream of the compressor of the first air boosting system and upstream of the compressor of the second air boosting system; and
at least one sensor positioned downstream of the compressor of the second air boosting system and upstream of the air intake manifold of the internal combustion engine.

3. The apparatus of claim 1 wherein at least one of the plurality of sensors comprises a virtual sensor configured to estimate an inlet pressure and an inlet temperature of the compressor of the second air boosting system.

4. The apparatus of claim 1 wherein the electrical air boosting system comprises a compressor, an electric torque machine configured to drive the compressor, and a power source configured to provide electrical power to the electric torque machine.

5. The apparatus of claim 1 wherein the turbocharger air boosting system comprises a compressor positioned upstream of the internal combustion engine and a turbine positioned downstream of the internal combustion engine and configured to drive the compressor using an exhaust flow of the internal combustion engine.

6. The apparatus of claim 4 wherein the electrical air boosting system further comprises a bypass valve configured to allow air flowing through the two-stage air boosting system to bypass the compressor of the electrical air boosting system.

7. The apparatus of claim 5 wherein the turbine of the turbocharger air boosting system is a variable geometry turbine.

8. Method to control a two-stage air boosting system of an internal combustion engine, the method comprising:
   monitoring a plurality of operating parameters of the two-stage air boosting system;
   determining a desired operating target command for one of said operating parameters corresponding to one stage of the two-stage air boosting system;
   determining an error between the desired operating target command and said one of said monitored operating parameters of the two-stage air boosting system;
   determining scheduled PID gains based on the determined error utilizing a PID controller;
   determining a system control command for the two-stage air boosting system based upon the scheduled PID gains; and
   controlling the two-stage air boosting system based upon the system control command for the air charging system.

9. The method of claim 8 wherein determining the desired operating target command comprises:
   determining a first desired pressure ratio across a first stage of the two-stage air boosting system and determining a second desired pressure ratio across a second stage of the two-stage air boosting system;
   determining the desired operating target command based upon at least one of the first and second desired pressure ratios.

10. The method of claim 9 wherein determining the first desired pressure ratio across the first stage of the two-stage air boosting system and determining the second desired pressure ratio across the second stage of the two-stage air boosting system comprises a two-stage power split method comprising:
   determining the first desired pressure ratio across the first stage of the two-stage air boosting system and determining the second desired pressure ratio across the second stage of the two-stage air boosting system based upon achieving a total desired pressure ratio across both the first stage of the two-stage air boosting system and the second stage of the two-stage air boosting system.

11. The method of claim 10 wherein the two-stage power split method comprises the following relationship:

$$p_{r_{des}} = \frac{p_{i_{des}}}{p_a} = p_{rc_{des}} \times p_{re_{des}} = \frac{p_{i_{des}}}{p_{c_{ds_{des}}}} \times \frac{p_{c_{ds_{des}}}}{p_a}$$

wherein $p_{r_{des}}$ is a total pressure ratio across both stages of the two stage air boosting system;
   $p_{i_{des}}$ is a desired intake pressure at an engine intake manifold of the internal combustion engine;
   $p_a$ is an ambient pressure;
   $p_{re_{des}}$ is a desired pressure ratio across the first stage of the two-stage air boosting system;
   $p_{rc_{des}}$ is a desired pressure ratio across the second stage of the two-stage air boosting system; and
   $p_{c_{ds_{des}}}$ is a desired pressure downstream of the second stage of the two-stage air boosting system.

12. The method of claim 9 wherein determining the first desired pressure ratio across the first stage of the two-stage air boosting system and determining the second desired pressure ratio across the second stage of the two-stage air boosting system comprises a two-stage power split method comprising:
   setting the respective desired pressure ratio across a selected one of the first and second stages of the two-stage air boosting system to a total desired pressure ratio across both the first and second stages of the two-stage air boosting system;
   monitoring an actual pressure ratio across said selected one of the first and second stages of the two-stage air boosting system;
   determining the difference between the total desired pressure ratio across both the first and second stages of the two-stage air boosting system and the actual pressure ratio across said selected one of the first and second stages of the two-stage air boosting system; and
   controlling the unselected one of the first and second stages of the two-stage air boosting system to achieve said determined difference.

13. The method of claim 8 wherein the desired operating target command comprises a desired pressure ratio across a compressor of an electrical air charging system.

14. The method of claim 8 wherein the desired operating target command comprises one of a desired air pressure at an intake manifold of the internal combustion engine, a desired engine torque, and a desired torque of a torque generating device of one stage of the two-stage air boosting system.

15. The method of claim 8 wherein the determined system control command for the two-stage air boosting system comprises a desired engine torque command.

16. The method of claim 8 wherein determining the system control command for the two-stage air boosting system further comprises:
   determining a feedforward system operating parameter based on the desired operating target command; and
   determining a feedforward system control command for at least one stage of the two-stage air boosting system by adding the scheduled PID gains to the determined feedforward system operating parameter.

17. The method of claim 8 wherein determining the system control command for the two-stage air boosting system further comprises:
   determining a feedback linearization system operating parameter based on a monitored operating parameter of the two-stage air boosting system; and
   determining a feedback linearization system control command for at least one stage of the two-stage air boosting system by adding the scheduled PID gains to the determined feedback linearization system operating parameter.

18. The method of claim 8 wherein the system control command for the two-stage air boosting system is determined in accordance with the following relationship:

$$T_e = \frac{1}{c}\left(\frac{cP_c}{\omega} - j + v\right) = \frac{1}{c}\left(\frac{cW_c c_p T_a r_e}{\omega} - j + v\right)$$

wherein c is calibration constant,
   $p_c$ is a desired power of a compressor of the first stage of the two-stage air boosting system;

ω is a desired speed of a torque device of the first stage of the two-stage air boosting system, j is an inertia component of a turboshaft and torque device of the first stage of the two-stage air boosting system, v is the scheduled PID control, $W_c$ is the fresh air flow through the compressor, and $T_a$ is an ambient temperature of air outside the two-stage air boosting system.

19. Apparatus for controlling a two-stage air boosting system of an internal combustion engine, said apparatus comprising:

a first air boosting system comprising one of an electrical air boosting system and a turbocharger air boosting system;

a second air boosting system positioned downstream of the first air boosting system and upstream of an air intake manifold of the internal combustion engine, the second air boosting system comprising the other of the electrical air boosting system and the turbocharger air boosting system;

a plurality of sensors providing information relating to operation of said two-stage air boosting system including inlet conditions of a compressor of the second air boosting system;

a control module configured to:
 determine at least one desired operating target command for at least one of said first and second air boosting systems;
 monitor operating parameters of the two-stage air boosting system;
 determine an error between said desired operating target command and a corresponding one of said monitored operating parameters;
 determine scheduled PID gains based on the error utilizing a PID controller;
 determine a system control command for at least one of said first and second air boosting systems based upon the scheduled PID gains; and
 control the two-stage air boosting system based upon the system control command.

* * * * *